(12) United States Patent
Hamano

(10) Patent No.: US 9,667,852 B2
(45) Date of Patent: May 30, 2017

(54) IMAGE PICKUP APPARATUS HAVING IN-FOCUS OPERATION BASED ON ONE FOCUS DETECTION AREA AND METHOD FOR CONTROLLING SAME

(71) Applicant: CANON KABUSHIKI KAISHA, Tokyo (JP)

(72) Inventor: Hideyuki Hamano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 370 days.

(21) Appl. No.: 13/910,586

(22) Filed: Jun. 5, 2013

(65) Prior Publication Data

US 2013/0329125 A1 Dec. 12, 2013

(30) Foreign Application Priority Data

Jun. 7, 2012 (JP) ................................. 2012-130101

(51) Int. Cl.
*G03B 13/00* (2006.01)
*H04N 5/232* (2006.01)

(52) U.S. Cl.
CPC ..... *H04N 5/23212* (2013.01); *H04N 5/23254* (2013.01)

(58) Field of Classification Search
CPC .......... G02B 7/285; G02B 7/36; G03B 13/36; H04N 5/23245; H04N 5/23212; H04N 5/3696
USPC ................................................ 348/345, 356
See application file for complete search history.

(56) References Cited

U.S. PATENT DOCUMENTS

| 6,229,568 B1 | 5/2001 | Kawaguchi et al. | |
|---|---|---|---|
| 2008/0002960 A1* | 1/2008 | Ito ........................... | G03B 13/36 396/125 |
| 2011/0157425 A1* | 6/2011 | Nakayama .......... | H04N 5/23245 348/234 |
| 2015/0130988 A1* | 5/2015 | Uenishi .............. | H04N 5/23212 348/349 |

FOREIGN PATENT DOCUMENTS

| JP | 0918768 A | | 1/1997 |
|---|---|---|---|
| JP | 2007-286438 A | | 11/2007 |
| JP | 2010078810 A | * | 4/2010 |
| JP | 2011-017800 A | | 1/2011 |
| JP | 2011113174 A | | 6/2011 |

* cited by examiner

*Primary Examiner* — Antoinette Spinks
(74) *Attorney, Agent, or Firm* — Canon USA Inc., IP Division

(57) ABSTRACT

An image pickup apparatus includes a focus adjustment unit, an image sensor, a focus evaluation value calculation unit, and a control unit configured to drive the focus adjustment unit based on a focus evaluation value to perform an in-focus operation. A change curve representing a change amount of a focus evaluation value indicating a focusing state of an object image includes a first slope before inversion of a sign of an inclination of the change curve at a peak value on the change curve and a second slope after inversion of a sign of an inclination of the change curve at a peak value on the change curve. The control unit determines whether the focus evaluation value corresponding to the peak value on the change curve is used for the in-focus operation based on an inclination of the first slope and an inclination of the second slope.

11 Claims, 10 Drawing Sheets

# IMAGE PICKUP APPARATUS HAVING IN-FOCUS OPERATION BASED ON ONE FOCUS DETECTION AREA AND METHOD FOR CONTROLLING SAME

BACKGROUND OF THE INVENTION

Field of the Invention

The present invention relates to an image pickup apparatus for performing focus adjustment using an image signal acquired by an image sensor that photoelectrically converts an object image formed by an imaging optical system, and a method for controlling the same.

Description of the Related Art

In a digital still camera and video camera, automatic focusing (hereinafter referred to as AF) is conventionally performed by detecting a signal corresponding to a contrast of an object image detected by an image sensor and focusing on the object using a signal output from the image sensor. Well known examples image sensors include a charge coupled device (CCD) or a complementary metal-oxide semiconductor (CMOS).

In the above-mentioned method, the contrast of the object image needs to be sequentially detected while moving a focus lens along an optical axis over a predetermined movement range (a scanning operation).

When the object enters or leaves a focus detection area as the object moves (object changes position) or a defocused state of the object changes during the scanning operation (e.g., due movement of the camera), the object changes during an AF operation so that the object is difficult to accurately focus on.

A method for coping with a case where the object changes during the AF operation includes a method for overlaying and arranging two focus detection areas (range-finding areas), which differ in size, within an imaging range, and determining that the object has moved when an evaluation value greatly changes only in a larger focus detection area, to change a position and a size of the focus detection area. An example of this method is discussed in U.S. Pat. No. 6,229,568 (counterpart Japanese Patent Application Laid-Open No. 09-018768).

However, in a conventional technique discussed in U.S. Pat. No. 6,229,568, described above, the focus detection area (range-finding area) is changed after it is detected that the object changes during the AF operation. Therefore, the AF operation needs to be performed again so that an AF time is lengthened. When the AF time is lengthened, the reliability of an AF evaluation result is damaged if the object moves.

In the conventional technique discussed in U.S. Pat. No. 6,229,568, described above, to obtain a reliable result, focus evaluation needs to be performed for at least two focus detection areas (range-finding areas). Therefore, the AF calculation load is large.

SUMMARY OF THE INVENTION

At least one embodiment of the present invention is directed to a focus adjustment apparatus capable of performing an AF operation at a small calculation load and in a short time without being affected by a change of an object during the AF operation.

According to an aspect of the present invention, an image pickup apparatus includes a focus adjustment unit configured to adjust a focusing state of an object image, an image sensor configured to photoelectrically convert the object image formed by an imaging optical system including the focus adjustment unit, a focus evaluation value calculation unit configured to extract a specific frequency component from an image signal output from an imaging area of the image sensor corresponding to a focus detection area, to calculate a focus evaluation value, and a control unit configured to drive the focus adjustment unit based on the focus evaluation value, to perform an in-focus operation, in which a change curve representing a change amount of the focus evaluation value indicating the focusing state of the object image includes a first slope portion before inversion of a sign of a slope of the change curve at a peak value on the change curve and a second slope portion after inversion of a sign of a slope of the change curve at a peak value on the change curve, and the control unit determines whether the focus evaluation value corresponding to the peak value on the change curve is used for the in-focus operation based on an inclination of the first slope portion and an inclination of the second slope portion.

According to another aspect of the present invention, a method for controlling an image pickup apparatus includes adjusting a focusing state of an object image in a focus adjustment unit, photoelectrically converting the object image formed by an imaging optical system including the focus adjustment unit, extracting a specific frequency component from an image signal output from an imaging area of the image sensor corresponding to a focus detection area, to calculate a focus evaluation value, and performing control to drive the focus adjustment unit based on the focus evaluation value, to perform an in-focus operation, in which a change curve representing a change amount of the focus evaluation value indicating the focusing state of the object image includes a first slope portion before inversion of a sign of a slope of the change curve at a peak value on the change curve and a second slope portion after inversion of a sign of a slope of the change curve at a peak value on the change curve, and it is determined according to the control whether the focus evaluation value corresponding to the peak value on the change curve is used for the in-focus operation, based on an inclination of the first slope portion and an inclination of the second slope portion.

According to the present invention, there can be provided a focus adjustment apparatus capable of performing an AF operation at a small calculation load and in a short time without being affected by a change of an object during the AF operation.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
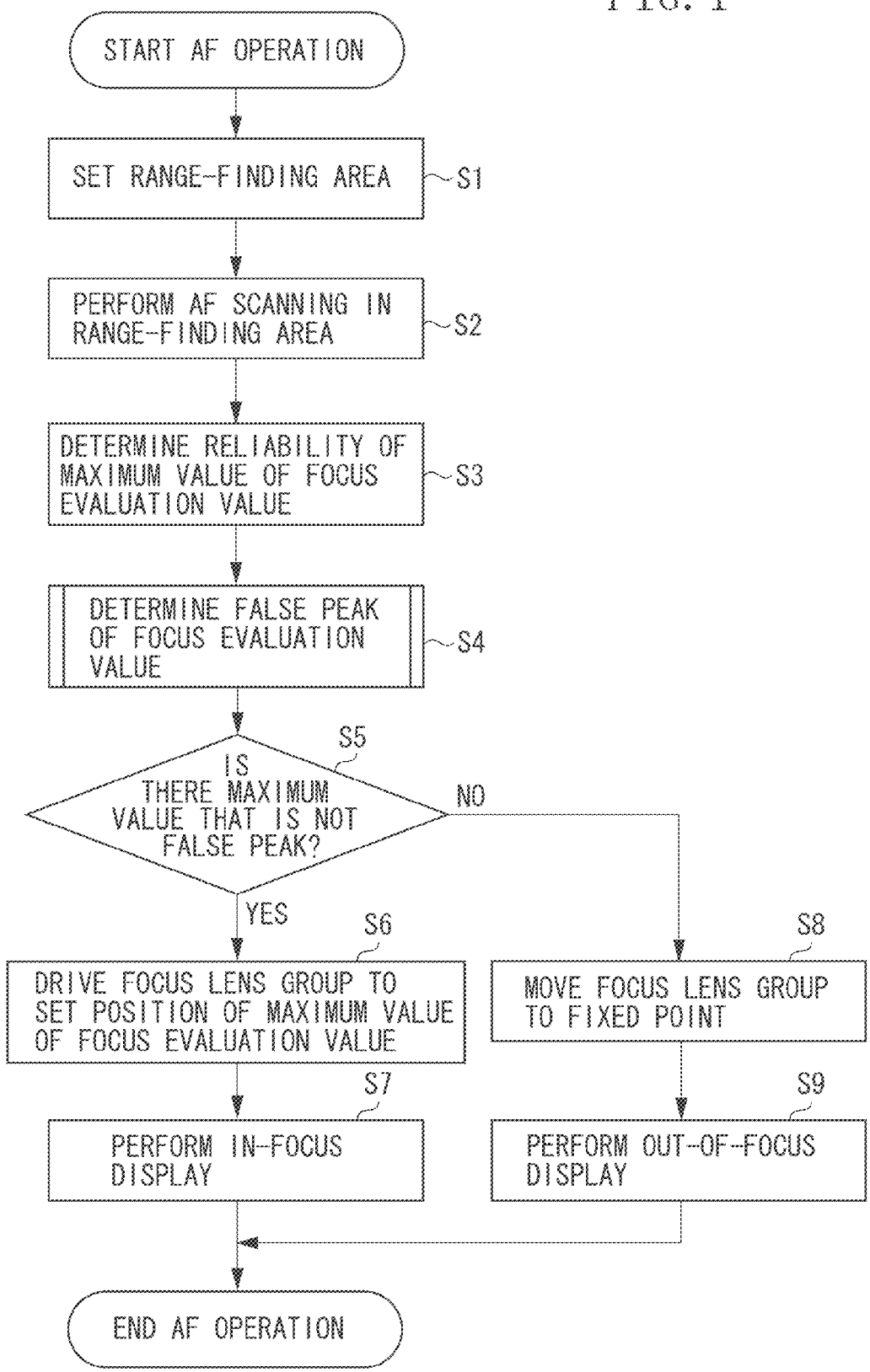
FIG. 1 is a flowchart illustrating the procedure for an AF operation of a focus adjustment apparatus according to a first exemplary embodiment of the present invention.
Figure 2:
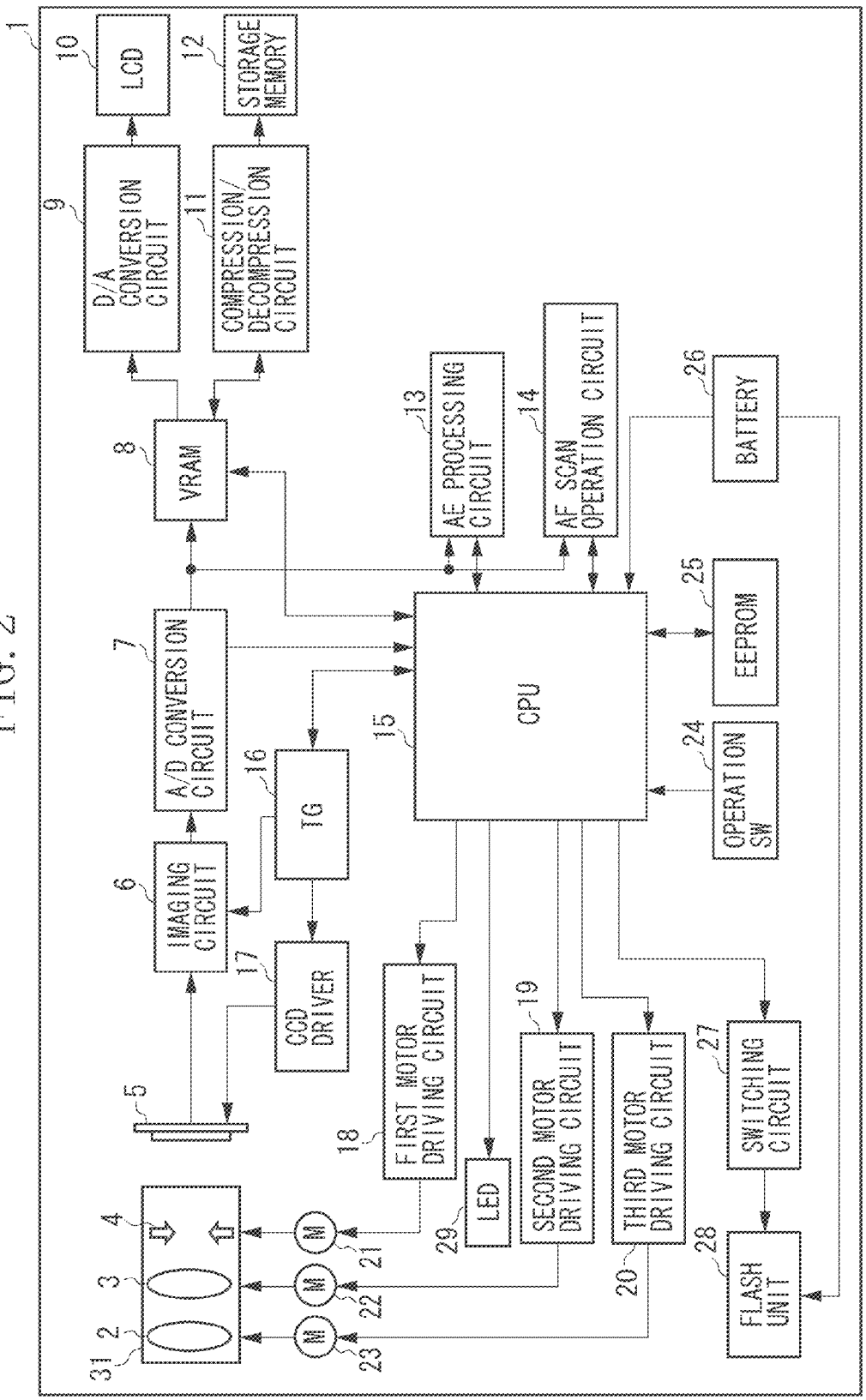
FIG. 2 is a block diagram of an image pickup apparatus including the focus adjustment apparatus according to the first exemplary embodiment of the present invention.

A first exemplary embodiment of the present invention will be described in detail below with reference to FIGS. 1 to 6. FIG. 2 is a block diagram illustrating an example of a schematic configuration of an image pickup apparatus including a focus adjustment apparatus according to the exemplary embodiment of the present invention. While the image pickup apparatus includes a digital still camera and a digital video camera, the present invention is not limited to these. As long as an image pickup apparatus acquires an optical image by focusing light onto an image sensor and by photoelectrically converting the light incident on the image sensor into an electric signal using two-dimensional array picture elements (pixels), the teachings disclosed herein will apply.

(Block Diagram of Image Pickup Apparatus)

In FIG. 2, an image pickup apparatus 1 includes a lens barrel 31, an image sensor 5, and related circuitry connected thereto. The lens barrel 31 includes a zoom lens group 2, a focus lens group 3, and a diaphragm 4. The zoom lens group 2 and the focus lens group 3 constitute an imaging optical system. The imaging optical system includes a focus adjustment unit for adjusting a focusing state of an object image. The focus lens group 3 and circuitry connected thereto form the focus adjustment unit. The diaphragm 4 serves as a light amount adjustment unit for controlling an amount of light flux that has passed through the imaging optical system and an exposure unit.

An image (commonly referred to as "object mage") is formed on an image sensor 5, such as a CCD or CMOS sensor, after light from an object scene has passed through the imaging optical system and is incident on the image sensor. The image sensor 5 photoelectrically converts the light incident thereupon into an object image. The image sensor that photoelectrically converts the light into an object image, which has been formed by the imaging optical system, may be a CMOS. An imaging circuit 6 generates a predetermined image signal by subjecting the object image to various types of image processing upon receiving an electrical signal obtained by the photoelectric conversion in the CCD 5. An analog-to-digital (A/D) conversion circuit 7 changes an analog image signal generated by the imaging circuit 6 into a digital image signal.

A memory (a video random access memory (VRAM)) 8 such as a buffer memory temporarily stores the digital image signal output from the A/D conversion circuit 7. A digital-to-analog (D/A) conversion circuit 9 reads out the image signal stored in the VRAM 8 and converts the read image signal into an analog signal while converting the image signal into an image signal in a form appropriate for a reproduced output.

An image display device such as a liquid crystal display (LCD) 10 displays the image signal. A storage memory 12 includes a semiconductor memory, and stores image data. A compression/decompression circuit 11 includes a compression circuit and a decompression circuit. The compression circuit subjects the image data stored in the storage memory 12 to compression processing and coding processing to read out the image signal temporarily stored in the VRAM 8 and change the read image signal into a form appropriate for storage in the storage memory 12. The decompression circuit subjects the image data stored in the storage memory 12 to decoding processing and decompression processing to change the read image signal into a form most appropriate to reproduce and display the stored image data.

An AE processing circuit 13 performs automatic exposure (AE) processing upon receiving the output from the A/D conversion circuit 7. An AF scan operation circuit 14 performs automatic focus (AF) processing upon receiving the output from the A/D conversion circuit 7. A central processing unit (CPU) 15, such as a microprocessor, contains a calculation memory that controls the image pickup apparatus 1. A timing generator (hereinafter referred to as a TG) 16 generates a predetermined timing signal.

The CPU 15 functions as a focus evaluation value calculation unit for extracting a specific frequency component from an image signal output from an imaging area of the image sensor 5 corresponding to a focus detection area, and calculating a focus evaluation value.

A CCD driver 17 drives the CCD 5. A diaphragm driving motor 21 drives the diaphragm 4. A first motor driving circuit 18 controls driving of the diaphragm driving motor 21. A focus driving motor 22 drives the focus lens group 3. The focus lens group 3 and the focus driving motor 22 correspond to the focus adjustment unit. A second motor driving circuit 19 controls driving of the focus driving motor 22. A zoom driving motor 23 drives the zoom lens group 2. A third motor driving circuit 20 controls driving of the zoom driving motor 23.

Further, an operation switch 24 includes various types of switch groups. An electrically erasable and programmable read only memory (EEPROM) 25 stores a program in advance. The program is used for performing various types of control and data manipulation, which i turn are used for causing the image pickup apparatus 1 to perform various types of operations. The image pickup apparatus 1 includes a battery 26, a flash unit 28, a switching circuit 27 that controls emission of flashlight from the flash unit 28, and a display element 29 such as a light emitting diode (LED) for displaying a good (OK) or not-good (NG) status of an AF operation.

The storage memory 12 serving as a storage medium for storing image data or the like is a fixed-type semiconductor memory, and has a card shape or a stick shape. Storage media in various forms such as magnetic storage media such as a hard disk and a flexible disk are used in addition to a semiconductor memory such as a card-type flash memory formed to be detachably attached to the image pickup apparatus 1.

The operation switch 24 includes a main power switch, a release switch, a reproduction switch, a zoom switch, and a switch for turning on/off display of an AF evaluation value signal on a monitor. The main power switch is used to start the image pickup apparatus 1 and supply power. The release switch starts an imaging operation (a storage operation). The reproduction switch starts a reproduction operation. The zoom switch moves the zoom lens group 2 in the imaging optical system, to perform zooming.

The release switch include two-stage switches, i.e., a first stroke switch (hereinafter referred to as SW1) for generating an instruction signal to start AE processing or an AF operation performed prior to an imaging operation and a second stroke switch (hereinafter referred to as SW2) for generating an instruction signal to start an actual exposure operation.

(In-focus Operation)

An in-focus operation (AF operation) according to a first exemplary embodiment of the present invention of an image pickup apparatus 1 having the above-mentioned configuration will be described below. FIG. 1 is a flowchart illustrating the procedure for the AF operation of the focus adjustment apparatus according to the first exemplary embodiment. The CPU 15 executes a control program relating to this operation.

The CPU 15 functions as a focus evaluation value calculation unit that extracts a specific frequency component from an image signal output from an imaging area of the image sensor 5 corresponding to a focus detection area and calculates a focus evaluation value.

As illustrated in FIG. 1, when the CPU 15 starts the AF operation, the processing proceeds to step S1. In step S1, the CPU 15 sets range-finding areas for adjusting the focus of an object. In the processing in step S1, one range-finding area is set within an image.

(Setting of Focus Detection Area)

Figure 3:
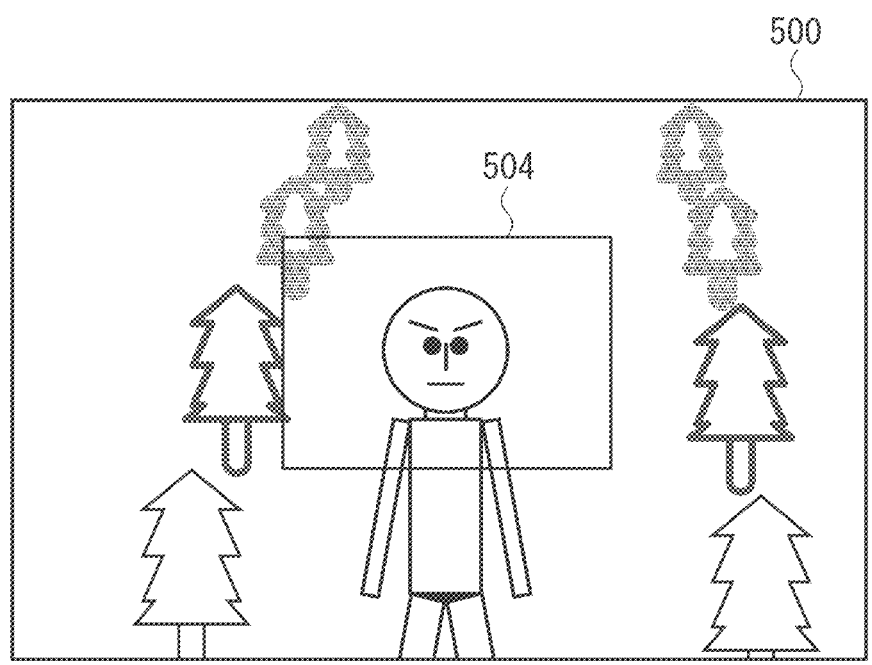
FIG. 3 illustrates a setting of a focus detection area (range-finding area) in the first exemplary embodiment of the present invention.

FIG. 3 illustrates an example of setting a range-finding area 504 serving as a focus detection area. In FIG. 3, the range-finding area 504 is set at the center of an imaging screen 500. The range-finding area 504 serving as a focus detection area is a range in which an image signal for performing focus adjustment is evaluated by an AF operation, described below. The AF operation aims at adjusting the focus of an object intended by a photographer within the range-finding area 504 serving as a focus detection area. It is then determined whether the range-finding area 504 serving as a focus detection area is affected by movement of the object during the AF operation.

Referring to FIG. 1 again, description of the flowchart will be continued.

In step S2, the CPU 15 performs AF scanning (a focus adjustment operation) in each of the range-finding areas 504, which has been set in step S1. In the AF scanning, the AF scan operation circuit 14 stores a focus evaluation value E[n] (where n=0, 1, 2, . . . , N−1) and a luminance signal difference value C[n] (where n=0, 1, 2, . . . , N−1) at each of positions of the focus lens group 3 in the CPU 15 while moving the focus lens group 3 by a predetermined amount from an AF scanning start position to an AF scanning end position.

The focus evaluation value E[n] represents a focus evaluation value E in the range-finding area 504 at the n-th position of the focus lens group 3 from the AF scanning start position. The number of scanning points from the start to the end of the AF scanning is N. The focus evaluation value E is calculated by extracting a high-frequency component of the image signal within the range-finding area 504 via a high-pass filter upon receiving the input image signal by the AF scan operation circuit 14 and further performing calculation processing such as cumulative addition. The focus evaluation value E thus calculated becomes an evaluation value that corresponds to an amount of a contour component having a high spatial frequency in the image signal within the range-finding area 504, decreases when the object is defocused, and reaches its maximum while the object is in focus.

A direction in which the high-frequency component is extracted may be either one of a row direction and a column direction, or both row and column directions, to calculate the focus evaluation value E.

The focus evaluation value E may be a value of the high-frequency component in typical one row within the range-finding area 504 serving as a focus detection area. The typical one row includes, for example, a row in which a value of the high-frequency component is the largest. The focus evaluation value E may be an integrated value of high-frequency components in all rows within the range-finding area 504.

The luminance signal difference value C[n] represents a luminance signal difference value in the range-finding area 504 at the n-th position of the focus lens group 3 from the AF scanning start position. The number of scanning points from the start to the end of the AF scanning is N. The luminance signal difference value C[n] is contrast information within the range-finding area 504, and is an evaluation value used when a threshold value set for the focus evaluation value E, described below, is set.

For example, the luminance signal difference value C[n] within the range-finding area 504 serving as a focus detection area is calculated by the following equation upon receiving the input image signal in the AF scan operation circuit 14:

$$C[n] = \sum_{l=1}^{L} (\max(l) - \min(l)) \quad \text{(Equation 1)}$$

max (l) and min (l) respectively represent, within an array of pixels in L rows constituting the range-finding area 504, a maximum value and a minimum value of a luminance signal in the first row. In the foregoing equation, a difference between the maximum value and the minimum value of the luminance signal is calculated for each of the rows, and the sum of the respective differences calculated in all the rows within the range-finding area 504 is determined as the luminance signal difference value C[n]. The image signal may be directly used as the luminance signal, or may be used after a noise having a high frequency is removed therefrom by being subjected to low-pass filter processing.

While the integrated value of the respective differences between the maximum values and the minimum values of the luminance signals in the rows is the luminance signal difference value C in the present exemplary embodiment, a calculation method therefor is not limited to this. For example, a maximum value of the respective differences between the maximum values and the minimum values of the luminance signals in the rows may be a luminance signal difference value C. The luminance signal difference value C is calculated in a direction that matches a direction in which the high-frequency component is extracted as the focus evaluation value E.

The luminance signal difference value C calculated using the equation 1 has a substantially proportional relationship to the focus evaluation value E, although only slightly affected by a change in in-focus state of a contour of the object, because it represents a contrast of the object. If the contrast of the object has changed to increase two times due to a change in illuminated state, both the luminance signal difference value C and the focus evaluation value E also increase two times.

The focus evaluation value E and the luminance signal difference value C may be obtained while moving the focus lens group 3.

In step S3, the CPU 15 then determines the reliability of a maximum value (a peak value) on a change curve of the focus evaluation value E relative to a position of the focus lens group 3. A position of the focus lens group 3, at which the focus evaluation value E takes a maximum value serving as a peak value, is calculated. Further, the reliability of the change curve of the focus evaluation value E in the vicinity of the maximum value is evaluated. The reliability is evaluated according to whether the obtained focus evaluation value E has a sufficient change curve shape to obtain a sufficient in-focus state of the object.

A specific reliability determination method may include a method, as discussed in FIGS. 10 to 13 in Japanese Patent Application Laid-Open No. 2010-078810, for example.

More specifically, it is determined whether the change curve of the focus evaluation value E representing an in-focus state has a highly reliable mountain shape, from a difference between a maximum value and a minimum value of the focus evaluation value E, the length of a portion of the change curve, which is inclined at a predetermined slope (SlopeThr) or more, and the slope of the inclined portion. Thus, the reliability can be determined.

(Determine False Peak of Focus Evaluation Value)

In step S4, the CPU 15 determines a false peak of the focus evaluation value E. False peak determination is performed as to find a maximum value on the change curve of the focus evaluation value E relative to a position of the focus lens group 3, which has been acquired in step S3.

False peak determination is performed to avoid a case where the change curve of the focus evaluation value E has a peak shape at a position other than a true in-focus position, i.e., avoid selecting a false peak as an in-focus position due to various disturbances. The various disturbances includes an effect of movement of the object on AF during AF scanning, which has been performed in step S2 and an effect of an object on AF outside the range-finding area 504 when image magnification and a defocused state change. Details of a method for determining a false peak of the focus evaluation value E will be described below.

In step S5, the CPU 15 then determines the presence or absence of a maximum value, which is not a false peak, of the focus evaluation value E relative to a position of the focus lens group 3. If the change curve of the focus evaluation value E relative to the position of the focus lens group 3 has one or more maximum values, false peak determination is performed for each of the maximum values in step S4, and it is determined in step S5 whether there exists a maximum value serving as a peak value that has not been determined to be a false peak.

If the change curve of the focus evaluation value E has a maximum value serving as a peak value that is not a false peak (YES in step S5), the processing proceeds to step S6.

In step S6, the CPU 15 calculates a peak position based on the focus evaluation value E, to drive the focus lens group 3 to the peak position. If there exists a plurality of maximum values of the focus evaluation value E, which has reliability and is not a false peak, in step S5, a maximum value representing a focus lens position on the closer distance side is set as an in-focus position, to drive the focus lens group 3. In step S7, the CPU 15 performs in-focus display, to end the AF operation.

On the other hand, if there is no maximum value except for a false peak, on the change curve of the focus evaluation value E (NO in step S5), the processing proceeds to step S8. In step S8, the CPU 15 drives the focus lens group 3 to a position having a high existence probability of the object, which is referred to as a previously set fixed point. In step S9, the CPU 15 performs out-of-focus display, to end the AF operation.

(Subroutine for Determining False Peak of Focus Evaluation Value in Step S4)

Figure 4:
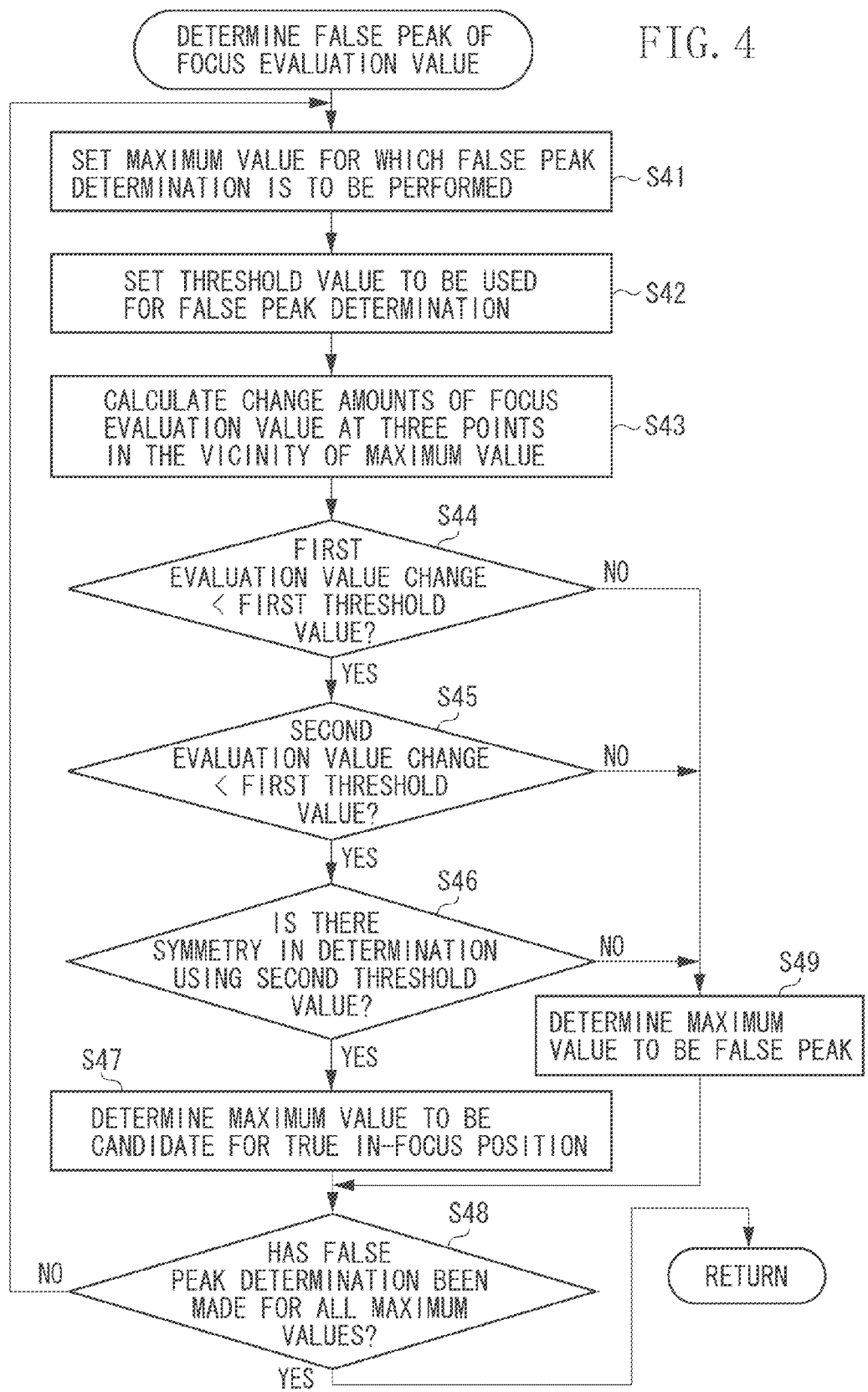
FIG. 4 illustrates a subroutine for determining a false peak of a focus evaluation value in the first exemplary embodiment of the present invention.

Referring to FIG. 4, a subroutine for determining a false peak of the focus evaluation value E, which is performed in step S4 illustrated in FIG. 1, according to the exemplary embodiment of the present invention of the focus adjustment apparatus having the above-mentioned configuration will be described below. FIG. 4 is a flowchart illustrating the procedure for processing for determining a false peak of the focus evaluation value E. The CPU 15 executes a control program relating to this operation.

In step S41, the CPU 15 sets the maximum value for which false peak determination is to be performed, out of maximum values serving as peak values of the focus evaluation value E that have been determined to have reliability from the reliability determination, which has been performed in step S3 illustrated in FIG. 1.

In step S42, the CPU 15 then sets a threshold value used for subsequent false peak determination. Two types of threshold values are set.

The first threshold value is a value for a change amount of the focus evaluation value E in the vicinity of the maximum value. As described above, the focus evaluation value E increases as the object changes from an out-of-focus state to an in-focus state. The degree of the increase is substantially determined depending on a contrast and a spatial frequency characteristic of the object that has passed through the imaging optical system, and a change characteristic of the focus evaluation value E by defocusing of the imaging optical system. More specifically, the upper limit of an increase amount of the focus evaluation value E can be calculated from the above information.

On the other hand, the focus evaluation value E may increase over the above-mentioned upper limit due to an effect of movement of the object during AF scanning, on the AF operation and an effect of an object outside the range-finding area 504 on the AF operation when image magnification and a defocused state change. The first threshold value is used to detect an inconceivable increase/decrease of the focus evaluation value E while detecting an in-focus state of the object and to determine that an evaluation value shape in the vicinity of the maximum value showing the increase/decrease of the focus evaluation value E beyond the first threshold value is a false peak.

The first threshold value is calculated by the following equation 2:

$$(\text{First threshold value}) = E\max \times \frac{C}{C\max} \times \frac{D\min}{D} \quad \text{(Equation 2)}$$

Emax in the equation 2 is a maximum value of a change amount of the focus evaluation value E relative to a unit driving amount of the focus lens group 3 under a condition that a depth of field D of the imaging optical system is the shallowest and a contrast of the object is equal to an exposure latitude of the CCD 5.

"Exposure latitude" means a range of exposure, in which an image can be reproduced in a picture.

In other words, Emax is a maximum value of a slope of the change curve of the focus evaluation value E obtained when the object is defocused under a condition that the change amount of the focus evaluation value E reaches its maximum (a focal length of the imaging optical system is the largest, an f-number is the smallest, an object distance is infinite, or a contrast of the object is the greatest). Emax is previously stored in the EEPROM 25. Emax differs depending on a frequency characteristic of a high-pass filter used when a high-frequency component of an image signal of the object is extracted. Therefore, Emax may be stored for each high-pass filter to be used. Thus, the first threshold value is changed by information about the depth of field D and information about the contrast of the object so that the false peak can be detected with higher accuracy in accordance with an imaging situation.

Cmax is a luminance signal difference value C calculated under a condition that the contrast of the object is equal to the exposure latitude of the CCD 5, i.e., a maximum contrast obtained by the CCD 5, and is a maximum value that can be calculated as the luminance signal difference value C. C in the equation 2 is a luminance signal difference value C at a position of the focus lens group 3 where a maximum value, for which false peak determination is being performed, has been obtained, and is calculated as described above.

Dmin is a minimum value of the depth of field D calculated from the imaging optical system and the object distance. Generally, the depth of field D has different distances on the front side and the rear side of the object. In the present embodiment, an average value of the distances on the front side and the rear side is calculated as the depth of field. D in the equation 2 is a depth of field D at a position of the focus lens group 3 where a maximum value, for which false peak determination is being performed, has been obtained. The image pickup apparatus according to the present exemplary embodiment previously stores in the EEPROM 25 a conversion table for converting an object distance from a position of the focus lens group 3. The depth of field D is calculated from a focal length of the imaging optical system, an f-number of the imaging optical system, a distance to the object, and a permitted circle-of-confusion diameter.

Therefore, according to the present exemplary embodiment, a first threshold value set when the information about the depth of field D of the imaging optical system is high is less than a first threshold value set when the information about the depth of field D of the imaging optical system is low. A first threshold value set when the information about the contrast of the object image is high is more than a first threshold value set when the information about the contrast of the object image is low.

The second threshold value is a value for determining left-right asymmetry of the change curve of the focus evaluation value E in the vicinity of the maximum value. As described above, the focus evaluation value E increases and decreases when a position of the focus lens group 3 moves from the infinite distance side to the closest distance side. The change curve of the focus evaluation value E formed at that time is substantially symmetrical when the object and the image pickup apparatus are not shaken.

On the other hand, the left-right symmetry of the change curve of the focus evaluation value E may be significantly lost due to an effect of movement of the object during AF scanning on the AF operation and an effect of an object outside the range-finding area 504 on the AF operation when image magnification and a defocused state change. The second threshold value is used to detect inconceivable asymmetry of the change curve of the focus evaluation value E while detecting an in-focus state of the object and to determine a shape in the vicinity of the maximum value having the asymmetry of the change curve of the focus evaluation value E beyond the second threshold value is a false peak.

As the second threshold value, an amount of deviance from one, of the ratio of a slope on the left side (upward side) and a slope on the right side (downward side) of the change curve of the focus evaluation value E in the vicinity of the maximum value described below, is set to 10%, for example.

If the shake of the object and the shake of the image pickup apparatus 1 during AF scanning are detected, the second threshold value may be changed n accordance with the magnitude of the shake using a shake detection amount. For example, if the shake detection amount is large, there are many noises on the change curve of the focus evaluation value E. Therefore, it is likely that the change curve of the focus evaluation value E at a true in-focus position may show asymmetry. In such a case, a determination that the maximum value of the focus evaluation value E in the vicinity of the true in-focus position is a false peak, can be prevented by increasing the second threshold value.

Referring to FIG. 4 again, the description of the flowchart will be continued.

In step S43, the CPU 15 calculates, from the focus evaluation value E in the vicinity of a maximum value about which false peak determination is made, an evaluation value change amount serving as a slope of the change curve. If the focus evaluation value E[k] in the range-finding area 504 at the k-th position of the focus lens group 3 from an AF scanning start position takes a maximum value, and it is determined whether the maximum value is a false peak, a first evaluation value change and a second evaluation value change are respectively calculated by the following equations 3 and 4:

$$\text{(first evaluation value change)} = \left( \sum_{m=0}^{3} (E[k-m] - E[k-(m-1)]) \right) \Big/ 4 \quad \text{(Equation 3)}$$

$$\text{(second evaluation value change)} = \left( \sum_{m=0}^{3} (E[k+m] - E[k+m+1]) \right) \Big/ 4 \quad \text{(Equation 4)}$$

From the foregoing equations, an average value of change amounts of the focus evaluation value E at three AF scanning positions in the vicinity of a maximum value serving as a peak value is calculated. While the focus evaluation value E is changed using the change amounts of the focus evaluation value E at the three positions in the vicinity of the maximum value in the present exemplary embodiment, the number of change amounts of the focus evaluation value E to be used is not limited to this. Generally, the smaller a movement interval of the focus lens group 3 during AF scanning becomes, the larger the number of change amounts of the focus evaluation value E to be used should be made to obtain information having few noises. The focus evaluation value E used to calculate the first evaluation value change corresponds to a first slope portion (upward slope portion), and the first evaluation value change corresponds to the slope of the first slope portion. The focus evaluation value E used to calculate the second evaluation value change corresponds to a second slope portion (downward slope portion), and the second evaluation value change corresponds to the slope of the second slope portion.

The processing then proceeds to step S44. In step S44, the CPU 15 determines whether the first evaluation value change is less than the first threshold value. If the first evaluation value change is less than the first threshold value (YES in step S44), i.e., if a change of the focus evaluation value E is a possible change as a change in in-focus state, the processing proceeds to step S45. In step S45, the CPU 15 determines whether the second evaluation value change is less than the first threshold value. If the second evaluation value change is less than the first threshold value (YES in step S45), i.e., if a change of the focus evaluation value E is a possible change as a change in in-focus state, the processing proceeds to step S46.

The change curve represents a change amount of the focus evaluation value E indicating a focusing state of an object image. In steps S44 and S45, the change curve includes a first slope portion before inversion of a sign of a curve slope at a maximum value on the change curve, and a second slope portion after inversion of a sign of a curve slope at a maximum value. When at least one of inclinations of the first slope portion and the second slope portion is the first threshold value or more, control is performed not to use the focus evaluation value E corresponding to the maximum value of the change curve for the in-focus operation of the object image. Further, when both of inclinations of the first slope portion and the second slope portion are less than the first threshold value, control is performed not to use the focus evaluation value E corresponding to the maximum value of the change curve for the in-focus operation of the object image.

In step S46, the CPU 15 then determines whether an absolute value of a difference between one and the ratio of the second evaluation value change to the first evaluation value change is less than the second threshold value from the following equation 5:

$$\left|1 - \frac{\text{(first evaluation value change)}}{\text{(second evaluation value change)}}\right| < \text{second threshold value} \quad \text{(Equation 5)}$$

If the absolute value of the difference between one and the ratio of the second evaluation value change to the first evaluation value change is less than the second threshold value (YES in step S46), i.e., if symmetry of the change curve of the focus evaluation value E in the vicinity of the maximum value is high, the processing proceeds to step S47.

While asymmetry of the change curve of the focus evaluation value E in the vicinity of the maximum value is determined using the ratio of the first evaluation value change to the second evaluation value change in the present exemplary embodiment, a method for determining asymmetry is not limited to this. For example, whether a difference between the first evaluation value change and the second evaluation value change is smaller than the second threshold value may be set, as expressed by the following equation 6:

$$\text{(first evaluation value change)} - \text{(second evaluation value change)} < \text{second threshold value} \quad \text{(Equation 6)}$$

If asymmetry of the change curve of the focus evaluation value E in the vicinity of the maximum value is determined from the equation 6, a second threshold value, which differ from that when the equation 5 is used, is set. If the equation 6 is used, a value obtained by multiplying the first threshold value calculated using the equation 2 by a coefficient, e.g., 0.2 is set as the second threshold value. Since the first threshold value changes depending on the depth of field of the imaging optical system or the contrast of the object as described above, the second threshold value is also changed depending on such change. When asymmetry of the change curve of the focus evaluation value E in the vicinity of the maximum value is determined using the equation 6, the first threshold value is only multiplied by the coefficient. Therefore, a load at which the second threshold value used for the determination is calculated can be reduced.

More specifically, as a modified example of the present exemplary embodiment, when a value obtained by subtracting an absolute value of the ratio of the first slope to the second slope, from one is the first threshold value or more, the focus evaluation value E corresponding to the maximum value of the change curve is not used for an in-focus operation of the object image. Further, when a value obtained by subtracting an absolute value of the ratio of the first slope to the second slope, from one is less than the first threshold value, the focus evaluation value E corresponding to the maximum value of the change curve is used for an in-focus operation of the object image.

In step S46 using the equation 5, when a difference between the absolute value of inclinations of the first slope and the absolute value of the second slope is the first threshold value or more, the focus evaluation value E corresponding to the maximum value of the change curve is not used for the in-focus operation of the object image. Further, when a difference of inclinations between the first slope and the second slope is less than the first threshold value, the focus evaluation value E corresponding to the maximum value of the change curve is used for the in-focus operation of the object image.

The larger the shake of the object and the shake of the image pickup apparatus become, the larger the second threshold value becomes, so that false peak determination can be more accurately performed.

In step S47, a maximum value, for which false peak determination has been performed, is determined to be a candidate for a true in-focus position because a change amount of the focus evaluation value E in the vicinity of the maximum value is appropriate and its left-right symmetry is high. On the other hand, if the first evaluation value change and the second evaluation value change are more than the first threshold value (NO in steps S44 and S45), the processing proceeds to step S49. In step S49, the CPU 15 determines that the maximum value, for which false peak determination has been performed, is a false peak.

If the absolute value of the difference between one and the ratio of the second evaluation value change to the first evaluation value change is more than the second threshold value (NO in step S46), the processing similarly proceeds to step S49. In step S49, the CPU 15 determines that the maximum value, for which false peak determination has been performed, is a false peak.

When false peak determination has been performed for one maximum value in steps S47 and S49, the processing proceeds to step S48. In step S48, the CPU 15 determines whether false peak determination has been performed for all maximum values in the focus evaluation value E[n]. If false peak determination has not yet been performed for all the maximum values (NO in step S48), the processing returns to step S41. In step S41, the CPU 15 continues false peak determination. If false peak determination has been performed for all the maximum values (YES in step S48), a subroutine for determining a false peak of the focus evaluation value E ends.

A case where an AF operation is actually performed under any imaging condition will be described below with reference to FIG. 5 to facilitate understanding of the flow of the AF operation and the subroutine for false peak determination.

(Change in Focus of Person 501 Serving as Main Object)

FIGS. 5A to 5D schematically illustrates a change by movement of the focus lens group 3 during AF scanning within the imaging screen 500 illustrated in FIG. 3. FIG. 3 illustrates a state where a person 501 as a main object is in focus.

Figure 5A:
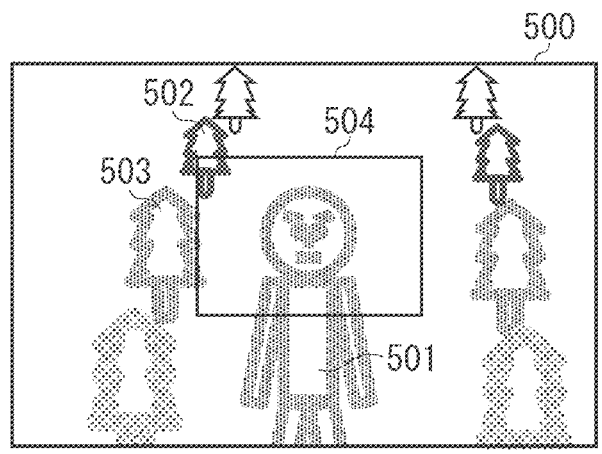
FIGS. 5A, 5B, 5C, and 5D schematically illustrate a change of an imaging screen during AF scanning in the first exemplary embodiment of the present invention.

FIG. 5A illustrates an in-focus state on the farthest distance side in FIGS. 5A to 5D. The person 501 as a main object and a tree 503 are defocused. On the other hand, a tree 502 far from the image pickup apparatus 1 is substantially in focus.

Figure 5B:
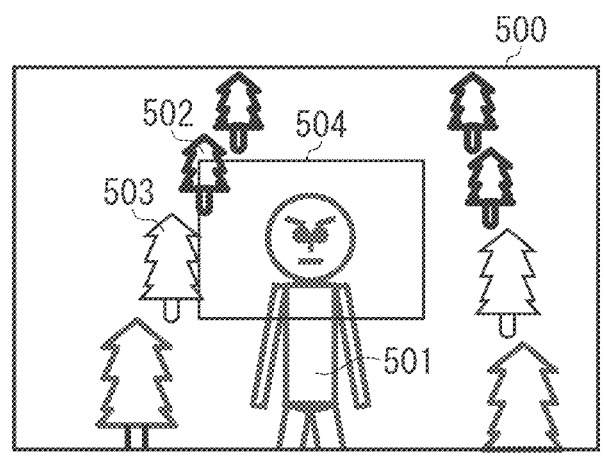

FIG. 5B illustrates an in-focus state at a closer distance than FIG. 5A. While the person 501 and the tree 502 are defocused, the tree 503 is substantially in focus. The contour of the tree 503 is substantially in focus so that the tree 503 does not exist within a range-finding area 504.

Figure 5C:
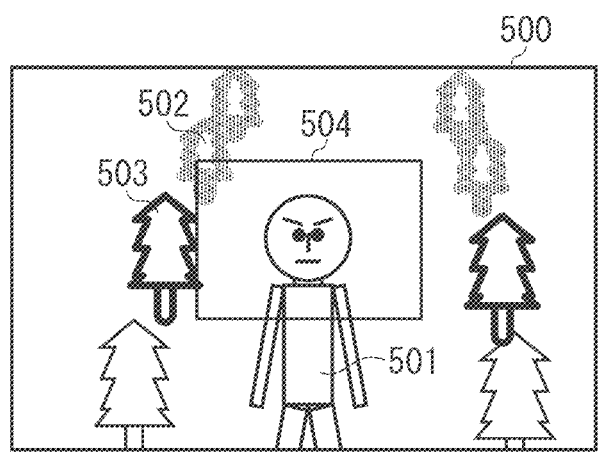

FIG. 5C illustrates an in-focus state at a closer distance than FIG. 5B. While the person 501 as a main object is substantially in focus, the trees 502 and 503 and a person 505 are defocused. The in-focus state illustrated in FIG. 5C is similar to that illustrated in FIG. 3.

Figure 5D:
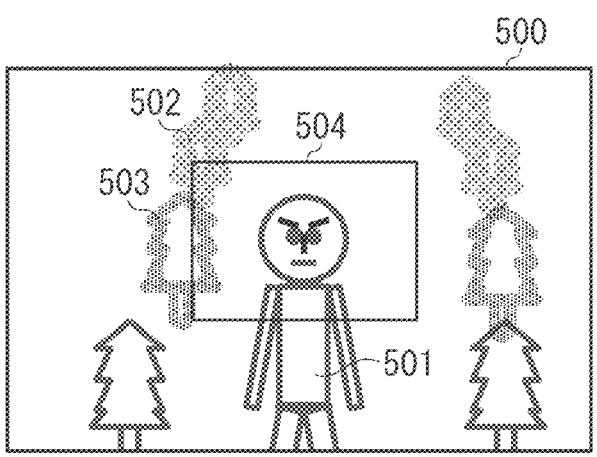

FIG. 5D illustrates an in-focus state at a closer distance than FIG. 5C. All the objects within the imaging screen 500 are defocused, although they differ in defocused state.

As the focus lens group 3 during AF scanning moves from the infinite distance side to the closest distance side (from FIG. 5A to 5D), an image magnification is changed by the imaging optical system, and a tree existing at the periphery of the imaging screen 500 slightly moves toward the center of the imaging screen 500. Therefore, in FIG. 5D, the contour of the tree 503 enters the range-finding area 504 due to the change in image magnification and the defocused state.

Figure 6:
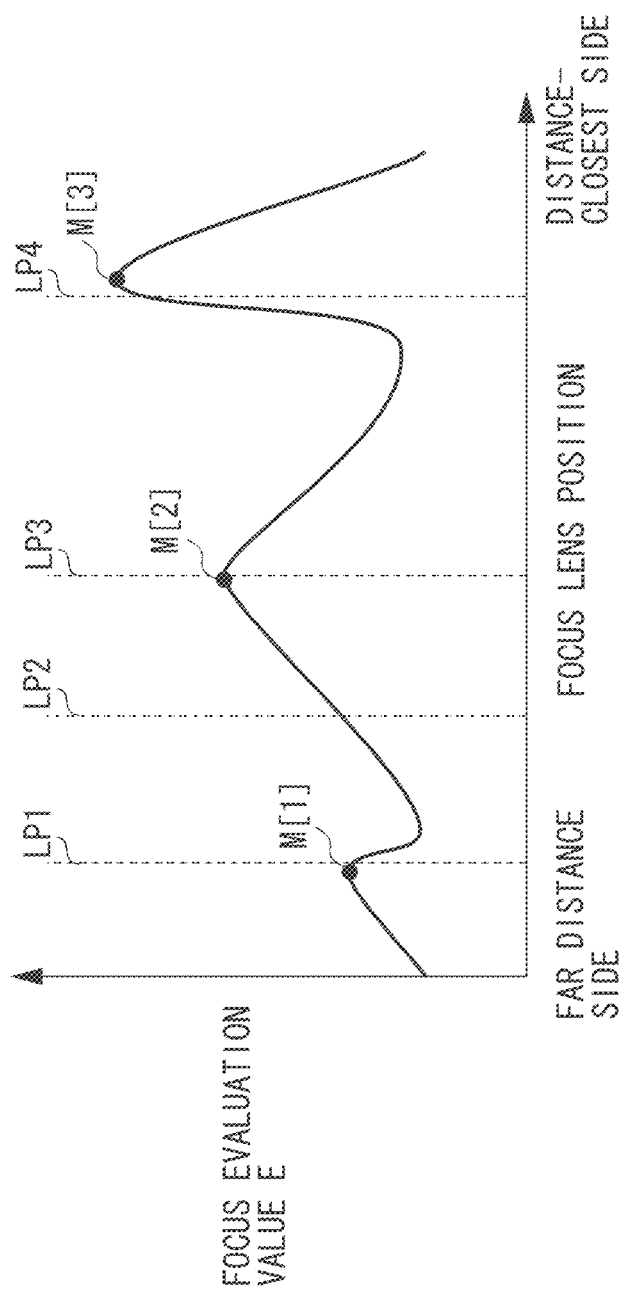
FIG. 6 illustrates a focus evaluation value E in a focus detection area (range-finding area) in a situation illustrated in FIG. 5 in the first exemplary embodiment of the present invention.

FIG. 6 illustrates a position of the focus lens group 3 and the focus evaluation value E in the range-finding area 504 in the situation illustrated in FIG. 5. A curve illustrated in FIG. 6 represents a change of the focus evaluation value E. Positions LP1, LP2, LP3, and LP4 of the focus lens group 3 respectively correspond to the positions of the focus lens group 3 illustrated in FIGS. 5A, 5B, 5C, and 5D.

In the situation illustrated in FIG. 5, the focus evaluation value E in the range-finding area 504 takes maximum values at three positions of the focus lens group 3. In FIG. 6, maximum values in the vicinities of the positions LP1, LP3, and LP4 of the focus lens group 3 are respectively M[1], M[2], and M[3]. The focus evaluation value E takes the maximum value M[2] in the vicinity of the position LP3 of the focus lens group 3 because the person 501 is substantially in focus at the position LP3 The change curve is affected by the tree 503 existing in the vicinity of a boundary on the left side of the range-finding area 504 and has maximum values in the vicinities of the positions LP1 and LP4 of the focus lens group 3.

The focus evaluation value E increases to the maximum value M[1] in the vicinity of the position LP1 of the focus lens group 3 as the contour of the tree 503 enters the range-finding area 504 in a defocused state. However, the focus evaluation value E decreases from the maximum value M[1] because the contour of the tree 503 leaves the range-finding area 504 as the tree 503 approaches the position LP2 of the focus lens group 3 in the vicinity of an in-focus position.

The focus evaluation value E increases to the maximum value M[3] in the vicinity of the position LP4 of the focus lens group 3 because the contour of the tree 503 enters the range-finding area 504 due to a change in image magnification and a change from an in-focus state to a defocused state. However, the focus evaluation value E decreases from the maximum value M[3] as the contour of the tree 503 is greatly defocused.

The maximum value M[1] in the vicinity of the position LP1 of the focus lens group 3 and the maximum value M[3] in the vicinity of the position LP4 of the focus lens group 3 are similar in that the effect of the defocused state of the contour of the tree 503 appears in the focus evaluation value E. However, from the effect of the change in image magnification in the imaging optical system according to the present exemplary embodiment, as the position of the focus lens group 3 moves to the closest distance side, the magnification of an object at the periphery of the imaging screen 500 decreases so that the object easily enters the range-finding area 504. On the closest distance side, a movement direction of the focus lens group 3 in which the contour of the tree 503 is greatly defocused and a movement direction of the focus lens group 3 in which the contour of the tree 503 approaches the range-finding area 504 due to the change in image magnification are the same. Therefore, the maximum value M[3] in the vicinity of the position LP4 of the focus lens group 3 is more than the maximum value M[1] in the vicinity of the position LP1.

A magnitude relationship between the maximum value M[2] in the vicinity of the position LP3 of the focus lens group 3 and the maximum value M[3] in the vicinity of the position LP4 of the focus lens group 3 is determined depending on a contrast between the person 501 and a background and a contrast between the background and the tree 503. In the situation illustrated in FIG. 6, the contrast between the background and the tree 503 is higher, so that the larger focus evaluation value E is represented as the maximum value M[3] in the vicinity of the position LP4 of the focus lens group 3.

In general contrast AF, a position of the focus lens group 3 representing a maximum value of the focus evaluation value E is detected as an in-focus position. Therefore, in the case illustrated in FIG. 6, a position in the vicinity of the position LP4 is an in-focus position, so that a totally defocused image is acquired, as illustrated in FIG. 5D. In the present exemplary embodiment, a false peak is excluded by false peak determination, and a position of the maximum value M[2] in the vicinity of the position LP3 is detected as a true in-focus position, so that a correct focus adjustment operation can be performed.

The AF operation in the situations illustrated in FIGS. 5 and 6 will be described with reference to the flows illustrated in FIGS. 1 and 4. First, in step S1, the CPU 15 sets the range-finding area 504. In step S2, the CPU 15 performs AF scanning. In step S3, the CPU 15 detects three maximum values for the focus evaluation value E, and calculates respective positions of the focus lens group 3 at which the focus evaluation value E takes the maximum values. In FIG. 6, positions of the focus lens group 3 in the vicinities of the positions LP1, LP3, and LP4 are respectively calculated as positions of the focus lens group 3 at which the focus evaluation value takes the maximum values M[1], M[2], and M[3].

The reliability of the change curve of the focus evaluation value E in the vicinity of each of the maximum values is determined. The maximum value M[1], which gently slopes in its vicinity, is determined to be low in reliability because a difference between a maximum value and a minimum value of the focus evaluation value E at the maximum value M[1] is less than a predetermined value. Each of the maximum values M[2] and M[3] is determined to be high in reliability because a difference between a maximum value and a minimum value of the focus evaluation value E is more than the predetermined value.

The processing then proceeds to the subroutine for determining a false peak of the focus evaluation value E in step S4. In step S41, the CPU 15 sets the maximum value M[2] as a maximum value for which false peak determination is to be performed. In step S42, the CPU 15 calculates a threshold value using the above-mentioned method. In step S43, the CPU 15 calculates a first evaluation value change and a second evaluation value change.

If the CPU 15 determines that the first evaluation value change and the second evaluation value change are less than the first threshold value, and an absolute value of a difference between one and the ratio of the first evaluation value change and the second evaluation value change is less than the second threshold value (YES in step S44 to S46), the maximum value M[2] is set as a candidate for an in-focus position that is true (high in reliability).

In step S48, the CPU 15 determines whether false peak determination has been performed for all the maximum values. If it is determined that false peak determination has not yet been performed for all the maximum values (NO in step S48), the processing returns to step S41. In step S41, the CPU 15 sets the maximum value M[3]. The threshold value, which has been calculated in step S42, is calculated again in accordance with the position LP4 of the focus lens group 3 at which the focus evaluation value E takes the maximum value M[3]. In step S43, the CPU 15 calculates the first evaluation value change and the second evaluation value change.

If the first evaluation value change is more than the first threshold value (NO in step S44), the processing then proceeds to step S49. In step S49, the CPU 15 determines the maximum value M[3] to be a false peak. This indicates that the left-side inclined plane has an inconceivable slope, in view of statuses of the imaging optical system and the object in the vicinity of the maximum value M[3] on the change curve of the focus evaluation value E illustrated in FIG. 6.

Even if there are no steps S44 and S45 of determining whether the first evaluation value change or the second evaluation value change is larger in FIG. 4, when the absolute value of the difference between one and the ratio of the first evaluation value change to the second evaluation value change is more than the second threshold value (NO in step S46), the processing proceeds to step S49. This indicates that there is no left-right symmetry of the change curve of the focus evaluation value E illustrated in FIG. 6 in the vicinity of the maximum value M[3] on the change curve.

As can be seen from the above-mentioned method for false peak determination, if there is either steps S44 and S45 of determining change amounts of the focus evaluation value E in the vicinities of the maximum values which is larger, or step S46 of determining left-right symmetry of the change curve of the focus evaluation value E in the vicinity of the maximum value, the effect of false peak determination can be obtained. While both of the determinations have been performed to perform false peak determination with higher accuracy in the present exemplary embodiment, the present exemplary embodiment is not limited to this. Either one of the determinations may be performed to reduce a load at which processing is performed.

The processing proceeds to step S48 again. If it is determined that false peak determination has been performed for all the maximum values (YES in step S48), the processing proceeds to step S5 illustrated in FIG. 1. In step S5, the maximum value M[2] exists as a maximum value that is not a false peak, and thus the processing proceeds to step S6. In the situation illustrated in FIG. 5, there is only one candidate as the maximum value that is not a false peak. Therefore, there is no choice left. If there is a plurality of maximum values with a high reliability, however, the maximum value on the closest distance side is selected, in which there is a higher probability that an object intended by a photographer exists. In step S6, the CPU 15 drives the focus lens group 3 to the focus lens position LP3 representing the maximum value M[2]. In step S7, the CPU 15 then performs in-focus display, to end the AF operation.

As described above, the present exemplary embodiment provides a method for controlling an image pickup apparatus including adjusting a focusing state of an object image in a focus adjustment unit, imaging by photoelectrically converting the object image formed by an imaging optical system provided with the focus adjustment unit in an image sensor, calculating a focus evaluation value by extracting a specific frequency component from an image signal output from an imaging area, of the image sensor corresponding to a focus detection area, and performing control to drive the focus adjustment unit based on the focus evaluation value, to perform an in-focus operation. The change curve representing a change amount of the focus evaluation value indicating the focusing state of the object image includes a first slope portion before inversion of a sign of a slope of the change curve at a peak value of the change curve, and a second slope portion after inversion of a sign of a slope of the change curve at a peak value. In the above controlling method, it is determined whether the focus evaluation value corresponding to the peak value on the change curve is used for the in-focus operation based on a slope of the first slope portion and a slope of the second slope portion.

While in the above case, there is only one range-finding area 504 as a focus detection area, the above-mentioned AF operation may be performed for each of the range-finding areas when a plurality of range-finding areas exists.

While the change in an in-focus state of the object is realized by the movement of the focus lens group 3 in the above-mentioned exemplary embodiment, a method for realizing the change in the in-focus state is not limited to this. For example, the change in the in-focus state may be realized by moving not the focus lens group but the image sensor. Further, an image pickup apparatus capable of acquiring information about an incident angle of a light beam (light field information) may realize the change in the in-focus state using reconstruction processing, as discussed in Japanese Patent Application Laid-Open No. 2011-113174.

By the foregoing configuration, a focus adjustment apparatus capable of performing an AF operation at a small calculation load and in a short time can be provided without being affected by a change of the object during the AF operation.

While the preferable exemplary embodiment of the present invention has been described above, it is to be understood that the present invention is not limited to the exemplary embodiment. Various modifications and changes may be within the scope of the present invention.

A second exemplary embodiment of the present invention will be described below with reference to FIGS. 7 to 9. The second exemplary embodiment differs from the first exemplary embodiment in the processing performed when only a false peak has been detected from a result of false peak determination of a focus evaluation value E. In the above-mentioned exemplary embodiment, if only the false peak has been detected, a focus lens group 3 is moved to a fixed point, and out-of-focus display is performed, so that accurate focus adjustment cannot be performed. In the second exemplary embodiment, under such a situation, accurate focus adjustment can be performed by setting a focus adjustment range again and performing focus adjustment again in more increased cases. As for a block diagram (FIG. 2) of an image pickup apparatus including the focus adjustment apparatus and a diagram (FIG. 4) illustrating processing for false peak determination in an AF operation in the first exemplary embodiment, a similar configuration is used, and similar operations are performed also in the second exemplary embodiment, and hence description thereof is not repeated. The AF operation illustrated in FIG. 1 in the second exemplary embodiment, which differs in processing details from those in the first exemplary embodiment, will be described with reference to FIG. 7.

Figure 7:
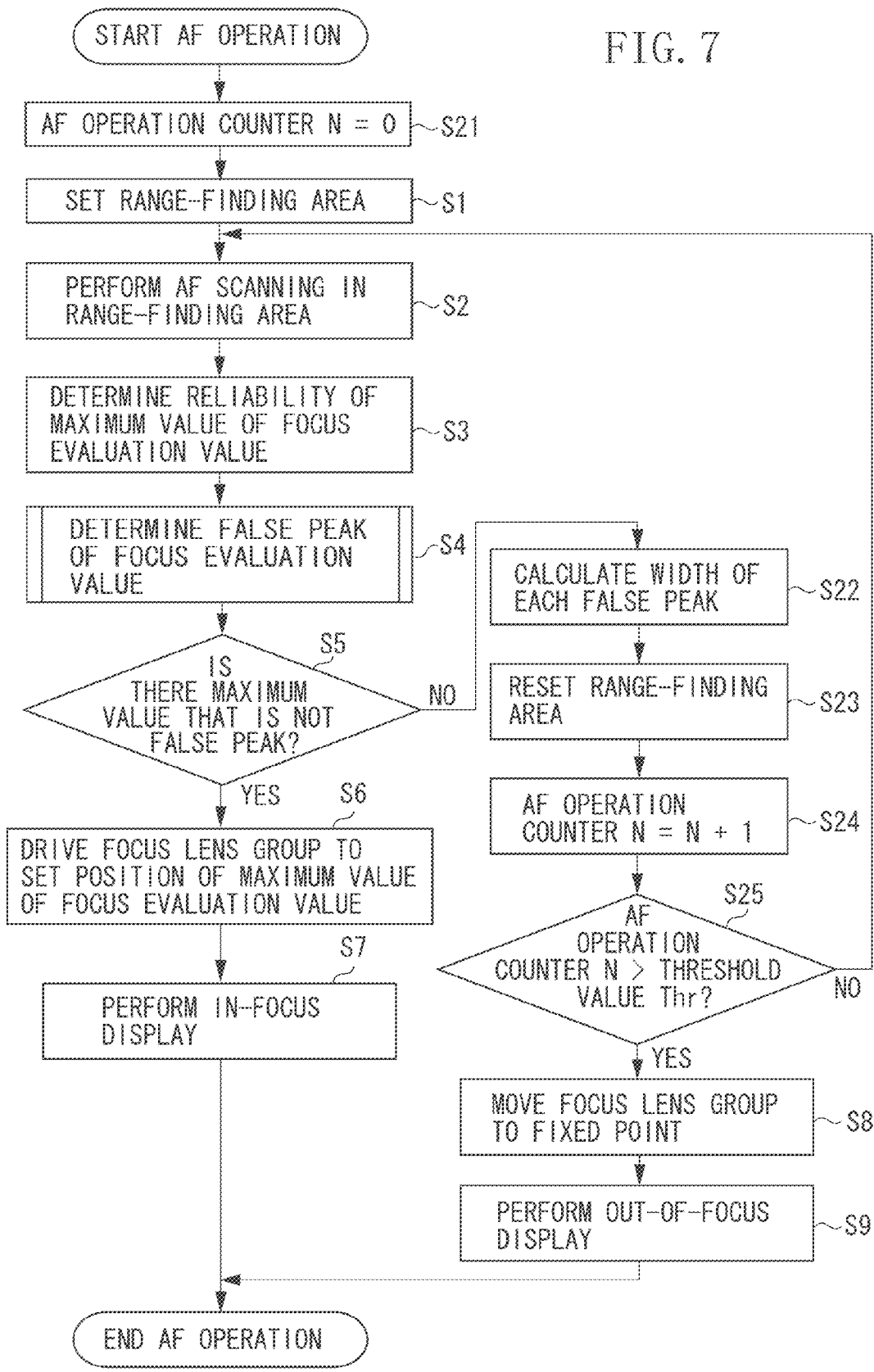
FIG. 7 is a flowchart illustrating the procedure for an AF operation of a focus adjustment apparatus according to a second exemplary embodiment of the present invention.

FIG. 7 is a flowchart illustrating the procedure for the AF operation of the focus adjustment apparatus in the second exemplary embodiment. Steps that perform the same operations as those in the first exemplary embodiment are assigned the same step numbers as those illustrated in FIG. 1. A CPU 15 executes a control program relating to this operation.

The CPU 15 functions as a focus evaluation value calculation unit for extracting a specific frequency component from an image signal output from an imaging area of an image sensor 5, that corresponds to a focus detection area, and calculating a focus evaluation value E.

When the CPU 15 starts the AF operation, the processing proceeds to step S21. In step S21, the CPU 15 first resets an AF operation counter N to zero. In step S1, the CPU 15 then sets range-finding areas for adjusting the focus of an object. In the processing in step S1, one range-finding area is set within an image.

Figure 8A:
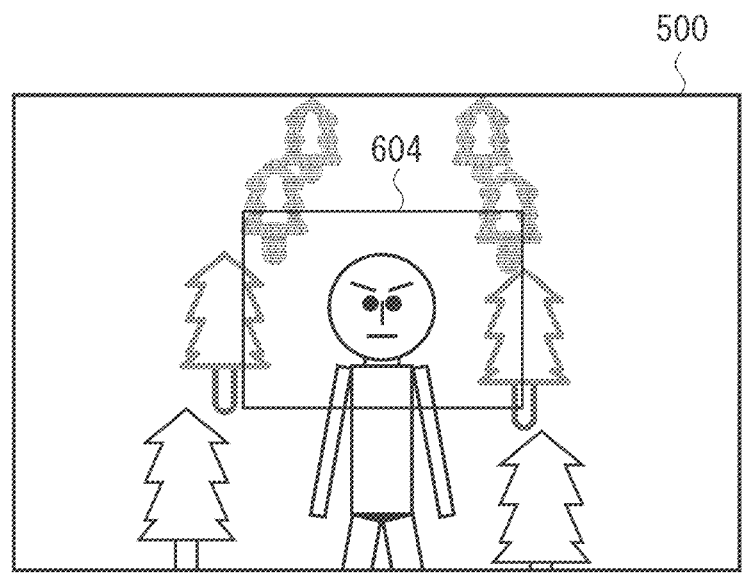
FIGS. 8A and 8B illustrate a setting of a focus detection area (range-finding area) in the second exemplary embodiment of the present invention.

FIG. 8 illustrates a setting of a range-finding area serving as a focus detection area. In FIG. 8A, a range-finding area 604 is set at the center of an imaging screen 500. The range-finding area 604 serving as a focus detection area is a range in which an image signal for performing focus adjustment is evaluated by an AF operation, described below. The AF operation aims at adjusting the focus of an object intended by a photographer within the range-finding area 604 serving as a focus detection area. It is then determined whether the range-finding area 604 serving as a focus detection area is affected by movement of the object during the AF operation.

The processing then proceeds to step S2. A processing content from step S2 to S5 is similar to that in the first exemplary embodiment, and hence description thereof is not repeated. Description (FIG. 4) relating to determination of a false peak of the focus evaluation value E, which is performed in step S4, is similar to that in the first exemplary embodiment, and hence description thereof is not repeated.

If a change curve of the focus evaluation value E has a maximum value that is not a false peak (YES in step S5), the processing proceeds to step S6. In step S6, the CPU 15 calculates a peak position based on the focus evaluation value E, to drive the focus lens group 3 to the peak position. If a plurality of maximum values of the focus evaluation value E, which has reliability and is not a false peak, exists in step S6, a maximum value representing a focus lens position at the closest distance is set as an in-focus position, to drive the focus lens group 3. In step S7, the CPU 15 performs in-focus display, to end the AF operation. A processing from step S5 to step S7 is similar to that in the first exemplary embodiment.

On the other hand, if there is no maximum value that is not a false peak on the change curve of the focus evaluation value E (NO in step S5), the processing proceeds to step S22.

Figure 9:
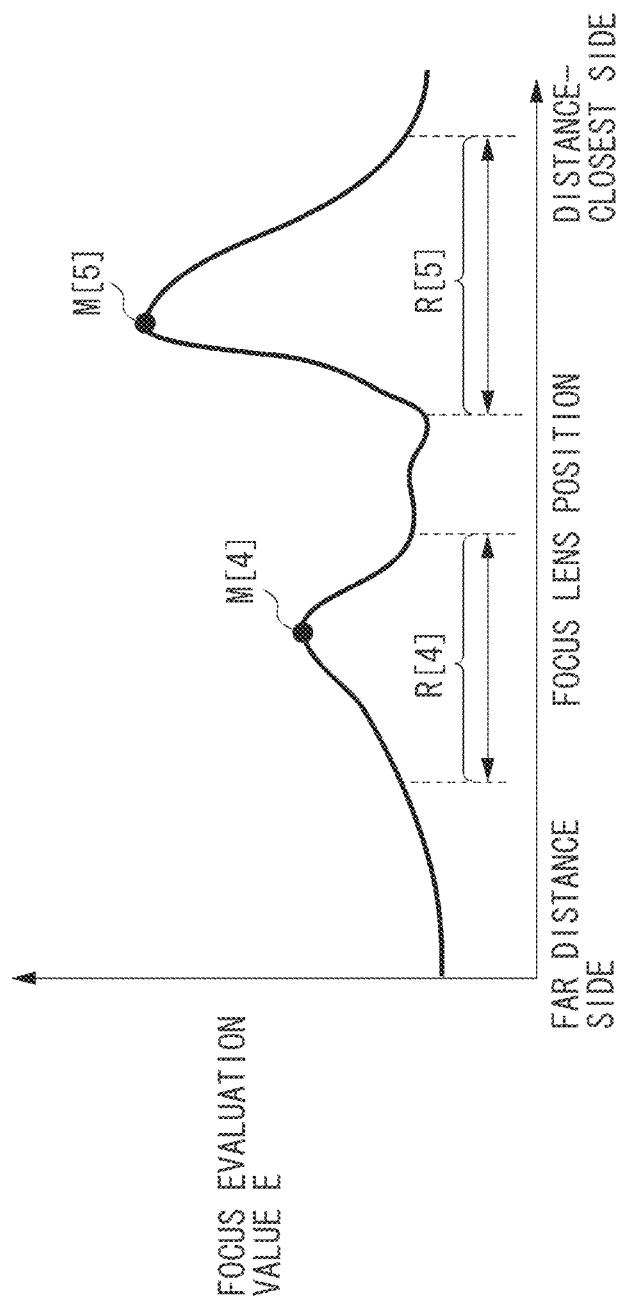
FIG. 9 illustrates a focus evaluation value E in a focus detection area (range-finding area) in a situation illustrated in FIG. 8 in the second exemplary embodiment of the present invention.

FIG. 9 illustrates a case where only a false peak exists on the change curve of the focus evaluation value E. In FIG. 9, the focus evaluation value E takes two maximum values M[4] and M[5]. The two maximum values are formed under the effect of trees existing in the vicinities of a boundary on the right and left sides of the range-finding area 604.

The maximum value M[4] has been determined to be a false peak in step S46 illustrated in FIG. 4 because the change curve has no left-right symmetry at the maximum value. The maximum value M[5] has been determined to be a false peak in step S44 because the slope of a left-side inclined plane of the change curve is large.

In FIG. 9, the determination that the obtained maximum value is only the false peak indicates that a situation illustrated in FIG. 8 is affected by the trees existing in the vicinities on the right and left sides of the boundary of the range-finding area 604 more greatly than in the situation illustrated in FIG. 5. In other words, the situation illustrated in FIG. 8 indicates that the trees exist at positions closer to the center of the range-finding area 604 than those in the situation illustrated in FIG. 5.

In the present exemplary embodiment, the width of the false peak is calculated from an obtained shape of the change curve of the focus evaluation value E, and the effect of the unnecessary object existing in the vicinity of the boundary of the range-finding area 604 is estimated, to calculate a reduction amount of the range-finding area 604. The AF operation is performed again using the range-finding area 604 set smaller. Thus, the effect of the object in the vicinity of the boundary of the range-finding area 604 is reduced, so that a correct focusing result can be obtained.

In step S22, the CPU 15 calculates the width of each of the false peaks. The width of a portion, which is inclined at a predetermined slope or more, of the change curve of the focus evaluation value E. FIGS. 9, R[4] and R[5] are respectively calculated as the widths of the maximum values M[4] and M[5].

In step S23, the CPU 15 narrows and resets the range-finding area 604 from the calculated width of the false peak. When the horizontal width of the range-finding area 604 before resetting is AFx_OLD, and the horizontal width of the range-finding area 604 after resetting is AFx_NEW, the horizontal width AFx_NEW is calculated in the following equation:

$$AFx\_NEW = K(MAX(R[4], R[5])) \times AFx\_OLD \quad \text{(Equation 7)}$$

In the equation 7, K(R) is a coefficient for resetting the horizontal width of the range-finding area 604, and is a function relating to the width of the false peak.

The larger the width R of the false peak is, the smaller the coefficient K(R) is. The larger the width R of the false peak is, the more greatly the false peak is affected by the object in the vicinity of the boundary of the range-finding area 604. To avoid the effect, the range-finding area 604 needs to be made smaller. MAX(R[4], R[5]) is a function which takes the largest value among widths of the false peaks, when a plurality of false peaks exists.

Figure 8B:
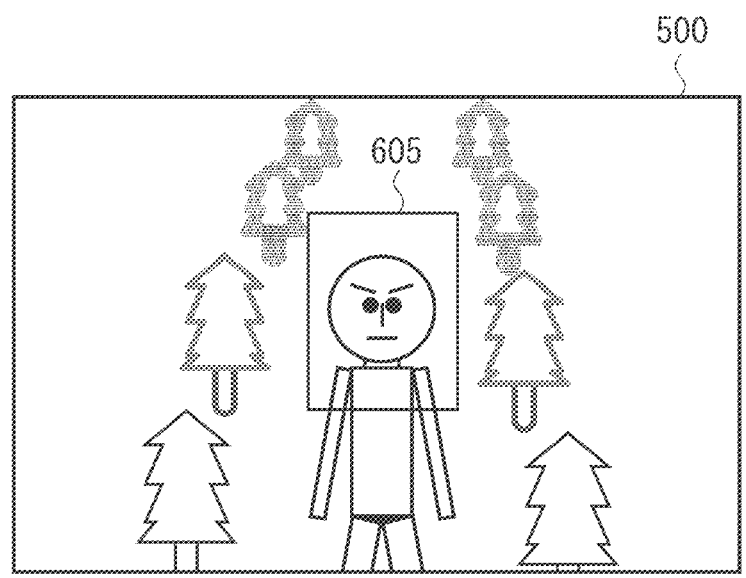

FIG. 8B illustrates a range-finding area 605 after resetting. When the range-finding area 605 is thus set, the effect of the periphery of the object can be reduced.

In step S24, the CPU 15 then increases the AF operation counter N by one. In step S25, the CPU 15 determines whether the AF operation counter N is more than a threshold value Thr. If the AF operation counter N is less than the threshold value Thr (NO in step S25), the processing returns to step S2. In step S2, the CPU 15 performs AF processing again using the range-finding area 605 after resetting.

In the second exemplary embodiment, the larger the width of a shape of a convex portion of the false peak that is not used for an in-focus operation, the smaller a focus detection area is set on the change curve of the focus evaluation value E. Focus adjustment is performed again.

On the other hand, if the AF operation counter N is more than the threshold value Thr (YES in step S25), the processing proceeds to step S8. Processing performed in steps S8 and S9 is similar to that in the first exemplary embodiment, and hence description thereof is not repeated.

When the image pickup apparatus 1 is configured as described above, even if the unnecessary object enters to a large degree the range-finding area 604 initially set, the reduction amount of the range-finding area 604 can be calculated from the width of the false peak. Thus, focus adjustment can be more likely to be performed for the object intended by the photographer.

While the range-finding area 604 is resized to be smaller if, only a maximum value exists that is a false peak on the change curve of the focus evaluation value E in the present exemplary embodiment, similar processing may be performed even if a candidate for a true in-focus position exists. This is because even if the candidate for a true in-focus position exists, other candidates for a true in-focus position may not be detected due to the maximum value that is a false peak. For such a case, the effect of the false peak can be reduced by resetting the range-finding area 604.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory(RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-130101 filed Jun. 7, 2012, which is hereby incorporated by reference herein in its entirety.

What is claimed is:

1. An image pickup apparatus comprising:
   an image sensor configured to photoelectrically convert an object image formed by an imaging optical system;
   a calculation unit configured to, as a scan operation, extract a specific frequency component from an image signal output from an imaging area of the image sensor corresponding to a focus detection area, to calculate a focus evaluation value based on the specific frequency component obtained by one scan operation of the focus detection area; and
   a control unit configured to drive a focus adjustment unit included in the imaging optical system based on the focus evaluation value, to perform an in-focus operation, wherein the focus adjustment unit is configured to adjust a focusing state of the object image,
   wherein a change curve representing a change amount of the focus evaluation value obtained by one scan includes a first slope portion before inversion of a sign of an inclination of the change curve at a peak value on the change curve and a second slope portion after inversion of a sign of an inclination of the change curve at the peak value on the change curve, and
   wherein the control unit determines whether the focus evaluation value corresponding to the peak value on the change curve is used for the in-focus operation, based on a comparison of an inclination of the first slope portion and an inclination of the second slope portion to a threshold value.

2. The image pickup apparatus according to claim 1, wherein
   the focus evaluation value corresponding to the peak value on the change curve is not used for the in-focus operation when the first slope portion is a predetermined threshold value or more, or the second slope portion is a predetermined threshold value or more.

3. The image pickup apparatus according to claim 2, wherein
   the focus evaluation value corresponding to the peak value on the change curve is used for the in-focus operation when both of inclinations of the first slope portion and the second slope portion are less than the first threshold value.

4. The image pickup apparatus according to claim 1, wherein
   the focus evaluation value corresponding to the peak value on the change curve is not used for the in-focus operation when a difference between absolute values of inclinations of the first slope portion and the second slope portion is a first threshold value or more.

5. The image pickup apparatus according to claim 4, wherein
   the focus evaluation value corresponding to the peak value on the change curve including the first slope portion and the second slope portion is used for the in-focus operation when a difference between inclinations of the first slope portion and the second slope portion is less than the first threshold value.

6. The image pickup apparatus according to claim 1, wherein
the focus evaluation value corresponding to the peak value on the change curve is not used for the in-focus operation when a value obtained by subtracting an absolute value of the ratio of the first slope inclination to the second slope inclination from one is a first threshold value or more.

7. The image pickup apparatus according to claim 6, wherein
the focus evaluation value corresponding to the peak value on the change curve is used for the in-focus operation when a value obtained by subtracting an absolute value of the ratio of the first slope inclination to the second slope inclination from one is less than the first threshold value.

8. The image pickup apparatus according to claim 1, wherein, when a depth of field of the imaging optical system is larger than a predetermined value, a first threshold value is set lower than a second threshold value set, when the depth of field of the imaging optical system is smaller than the predetermined value.

9. The image pickup apparatus according to claim 1, wherein, when contrast of the object image is larger than a predetermined value, a first threshold value is set higher than a second threshold value set, when the contrast of the object image is smaller than the predetermined value.

10. The image pickup apparatus according to claim 1, wherein, when there is no change curve used for the in-focus operation, the width of the focus detection area is set narrow based on information about a width of the change curve not used for the in-focus operation, to perform focus adjustment again.

11. A method for controlling an image pickup apparatus, the method comprising:
causing an image sensor to photoelectrically convert an object image formed by an imaging optical system into an image signal;
in a scan operation, adjusting a focusing state of the object image with a focus adjustment unit included in the imaging optical system;
extracting a specific frequency component from the image signal output from an imaging area of the image sensor corresponding to a focus detection area, to calculate a focus evaluation value based on the specific frequency component obtained by one scan operation of the focus detection area; and
performing control to drive the focus adjustment unit based on the focus evaluation value, to perform an in-focus operation,
wherein a change curve representing a change amount of the focus evaluation value obtained by one scan includes a first slope portion before inversion of a sign of an inclination of the change curve at a peak value on the change curve and a second slope portion after inversion of a sign of an inclination of the change curve at a peak value on the change curve, and
wherein the performing control includes determining whether the focus evaluation value corresponding to the peak value on the change curve is used for the in-focus operation, based on a comparison of an inclination of the first slope portion and an inclination of the second slope portion to a threshold value.

* * * * *